United States Patent
Wu

(10) Patent No.: US 8,582,561 B2
(45) Date of Patent: Nov. 12, 2013

(54) METHOD OF HANDLING P-TMSI CHANGE IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 557 days.

(21) Appl. No.: 12/533,014

(22) Filed: Jul. 31, 2009

(65) Prior Publication Data
US 2011/0026469 A1 Feb. 3, 2011

(51) Int. Cl.
*H04L 12/66* (2006.01)

(52) U.S. Cl.
USPC ............ 370/352; 370/329; 370/330; 370/331

(58) Field of Classification Search
None
See application file for complete search history.

(56) References Cited

U.S. PATENT DOCUMENTS

| | | | | |
|---|---|---|---|---|
| 5,884,175 | A * | 3/1999 | Schiefer et al. | 455/436 |
| 5,896,414 | A * | 4/1999 | Meyer et al. | 375/222 |
| 6,173,378 | B1 * | 1/2001 | Rozario et al. | 711/163 |
| 6,278,876 | B1 * | 8/2001 | Joshi et al. | 455/427 |
| 6,463,055 | B1 * | 10/2002 | Lupien et al. | 370/353 |
| 6,731,932 | B1 * | 5/2004 | Rune et al. | 455/432.1 |
| 6,763,233 | B2 * | 7/2004 | Bharatia | 455/433 |
| 6,788,953 | B1 * | 9/2004 | Cheah et al. | 455/550.1 |
| 7,184,792 | B2 * | 2/2007 | Mir | 455/522 |
| 7,215,943 | B2 * | 5/2007 | Verma et al. | 455/410 |
| 7,310,478 | B1 * | 12/2007 | Norman et al. | 398/5 |
| 7,359,347 | B2 * | 4/2008 | Ahmavaara et al. | 370/328 |
| 7,450,540 | B2 * | 11/2008 | Gronberg et al. | 370/328 |
| 7,580,414 | B2 * | 8/2009 | Yi | 370/395.52 |
| 7,778,227 | B2 * | 8/2010 | Gibbs | 370/338 |
| 8,175,033 | B2 * | 5/2012 | Kim | 370/328 |
| 2002/0131395 | A1 * | 9/2002 | Wang | 370/349 |
| 2002/0131396 | A1 * | 9/2002 | Knuutila et al. | 370/349 |
| 2003/0153309 | A1 * | 8/2003 | Bjelland et al. | 455/432 |
| 2003/0169725 | A1 * | 9/2003 | Ahmavaara et al. | 370/352 |
| 2004/0013114 | A1 * | 1/2004 | Su et al. | 370/389 |
| 2004/0120283 | A1 * | 6/2004 | Rezaiifar et al. | 370/328 |
| 2004/0266435 | A1 * | 12/2004 | de Jong et al. | 455/436 |
| 2004/0266438 | A1 * | 12/2004 | Bjelland et al. | 455/437 |
| 2005/0037753 | A1 * | 2/2005 | Andersen et al. | 455/435.2 |
| 2005/0151686 | A1 * | 7/2005 | Ali et al. | 342/464 |

(Continued)

FOREIGN PATENT DOCUMENTS

CN 101180909 A 5/2008

OTHER PUBLICATIONS

3GPP TS 24.008 V8.2.0 "Mobile radio interface Layer 3 specification Core network protocols", Jun. 2008.

(Continued)

*Primary Examiner* — Warner Wong
*Assistant Examiner* — Dung B Huynh
(74) *Attorney, Agent, or Firm* — Winston Hsu; Scott Margo

(57) ABSTRACT

A method of handling a packet-temporary mobile subscriber identity, hereinafter called P-TMSI, for a network of a wireless communication system includes sending a first message through a first procedure to assign a first P-TMSI to a mobile station using a second P-TMSI, receiving a second message corresponding to a second procedure and the first P-TMSI before the network receives a response message of the first message corresponding to the first procedure, and then accepting the second message.

16 Claims, 9 Drawing Sheets

(56) References Cited

U.S. PATENT DOCUMENTS

| | | |
|---|---|---|
| 2005/0265279 A1* | 12/2005 | Markovic et al. ............. 370/328 |
| 2005/0272422 A1* | 12/2005 | Asadi ......................... 455/432.2 |
| 2006/0187933 A1* | 8/2006 | Yi .............................. 370/395.2 |
| 2006/0193289 A1* | 8/2006 | Ronneke et al. ............. 370/329 |
| 2006/0209799 A1* | 9/2006 | Gallagher et al. ........... 370/352 |
| 2006/0234709 A1* | 10/2006 | Marinescu et al. ........... 455/436 |
| 2006/0256749 A1* | 11/2006 | Rexhepi et al. .............. 370/329 |
| 2007/0213057 A1* | 9/2007 | Shaheen ....................... 455/436 |
| 2007/0214269 A1* | 9/2007 | Davidsson ................... 709/227 |
| 2007/0234170 A1* | 10/2007 | Shao et al. ................... 714/746 |
| 2008/0195912 A1* | 8/2008 | Mende et al. ................ 714/752 |
| 2008/0316980 A1* | 12/2008 | Ahlen et al. ................. 370/338 |
| 2009/0154467 A1* | 6/2009 | Diab ........................... 370/395.4 |
| 2010/0011270 A1* | 1/2010 | Yamamoto et al. ........... 714/748 |
| 2010/0081435 A1* | 4/2010 | Huang ........................ 455/435.1 |
| 2010/0122342 A1* | 5/2010 | El-Moussa et al. ............. 726/22 |
| 2010/0246533 A1* | 9/2010 | Lundin et al. ................. 370/332 |
| 2011/0009113 A1* | 1/2011 | Vikberg et al. ............. 455/422.1 |
| 2011/0134836 A1* | 6/2011 | Lin et al. ...................... 370/328 |
| 2011/0211513 A1* | 9/2011 | Coleri Eregen et al. ...... 370/311 |

OTHER PUBLICATIONS

3GPP TS 44.018 V8.3.0 "Radio Resource Control (RRC) protocol", May 2008.

Office action mailed on Aug. 31, 2012 for the China application No. 200910265638.7, filing date Dec. 28, 2009, p. 1-6.

* cited by examiner

| Step | Direction | Message/Procedure | Comment/Event |
|---|---|---|---|
| | | | The MS is powered on and camps on a cell with RAI-1 |
| 1 | MS <-> MSC | Location update procedure | IMSI Attach |
| 2 | MS<->SGSN | GPRS attach procedure | ATTACH ACCEPT message contains : <br> Mobile identity = P-TMSI-2 <br> P-TMSI-2 signature <br> Routing area identity = RAI-1 |
| | | | The MS reselects a cell with RAI-4. |
| 3 | MS -> SGSN | ROUTING AREA UPDATING REQUEST | Update type = 'RA updating' <br> P-TMSI-2 signature <br> Routing area identity = RAI-4 |
| 4 | SGSN ->MS | ROUTING AREA UPDATING ACCEPT | Update result = 'RA updated' <br> Mobile identity = P-TMSI-1 <br> P-TMSI-1 signature <br> Routing area identity = RAI-4 |

FIG. 4A

| Step | Direction | Message/Procedure | Comment/Event |
|---|---|---|---|
| | | | The MS makes a MO call |
| 5 | MS ->BSC | GPRS SUSPENSTION REQUEST | (TLLI, RAI-4) included. TLLI is derived from P-TMSI-1 |
| 6 | BSC->SGSN | GPRS SUSPENSTION REQUEST | (TLLI, RAI-4) included. TLLI is derived from P-TMSI-1. |
| 7 | SGSN- >BSC | GPRS SUSPENSTION ACK | The TLLI is considered as invalid |
| | | | The MS suspends in-use GPRS services |

FIG. 4B

| Step | Direction | Message/Procedure | Comment/Event |
|---|---|---|---|
| | | | The MS is powered on and camps on a cell with RAI-1 |
| 1 | MS ->SGSN | ATTACH REQUEST | Attach type = 'Combined GPRS / IMSI attach' or 'GPRS attach while IMSI attached';<br>Mobile identity = IMSI |
| 2 | SGSN ->MS | ATTACH ACCEPT | Attach result = 'Combined GPRS / IMSI attached';<br>Mobile identity = P-TMSI-2 ;<br>P-TMSI-2 signature ;<br>Routing area identity = RAI-1 |
| 3 | MS ->SGSN | ATTACH COMPLETE | |
| | | | The MS reselects a cell with RAI-4 |
| 4 | MS ->SGSN | ROUTING AREA UPDATING REQUEST | Update type = 'Combined RA/LA updating';<br>P-TMSI-2 signature;<br>Routing area identity = RAI-4;<br>Timer T3311 is started |
| 5 | SGSN -> MS | ROUTING AREA UPDATING ACCEPT | Update result = 'RA updated';<br>Mobile identity = P-TMSI-1 ;<br>P-TMSI-1 signature ;<br>Routing area identity = RAI-4;<br>GMM cause = "MSC temporarily not reachable' |
| 6 | MS -> SGSN | ROUTING AREA UPDATING COMPLETE | |

FIG. 6A

| Step | Direction | Message/Procedure | Comment/Event |
|---|---|---|---|
| | | | The routing area updating attempt counter =1. The combined routing area updating procedure is reinitialized at the expiry of T3311 |
| | | | The MS performs three consecutive unsuccessful combined routing area updating procedures. The routing area updating attempt counter =4. The combined routing area updating procedure is reinitialized at the expiry of T3311 |
| 7 | MS ->SGSN | ROUTING AREA UPDATING REQUEST | Update type = 'Combined RA/LA updating with IMSI Attach'; P-TMSI-1 signature; Routing area identity = RAI-4 |
| 8 | SGSN -> MS | ROUTING AREA UPDATING ACCEPT | Update result = 'RA updated';Mobile identity = P-TMSI-1 ; P-TMSI-1 signature ;Routing area identity = RAI-4; GMM cause = 'Network failure' |
| | | | The routing area updating attempt counter =5. The MS performs Location Update Procedure to resume CS services. |
| | | | The MS postpones a GPRS suspension procedure |

FIG. 6B

| Step | Direction | Message/Procedure | Comment/Event |
|---|---|---|---|
| 9 | MS -> SGSN | ROUTING AREA UPDATING COMPLETE | |
| 10 | MS -> BSC | GPRS SUSPENSION REQUEST | (TLLI, RAI-4) included. TLLI is derived from P-TMSI-1. |
| 11 | BSC -> SGSN | GPRS SUSPENSION REQUEST | (TLLI, RAI-4) included. TLLI is derived from P-TMSI-1. |
| 12 | SGSN -> BSC | GPRS SUSPENSION ACK | SGSN determines the TLLI is invalid |
| 13 | MS -> MSC | LOCATION UPDATING REQUEST | Location Update Procedure for IMSI Attach is initiated. |
| 14 | MSC -> MS | LOCATION UPDATING ACCEPT | New TMSI is assigned |
| 15 | MS -> MSC | LOCATION UPDATING COMPLETE | |

FIG. 6C

METHOD OF HANDLING P-TMSI CHANGE IN A WIRELESS COMMUNICATION SYSTEM AND RELATED COMMUNICATION DEVICE

BACKGROUND OF THE INVENTION

1. Field of the Invention

The present invention relates to a method and related communication device in a wireless communication system, and more particularly, to a method and related communication device of the wireless communication system for handling a procedure parameter change.

2. Description of the Prior Art

General Packet Radio Service (GPRS) is a service in a GSM (Global System for Mobile communications) system, and is one of the objects of the standardization work at ETSI (European Telecommunication Standard Institute) and 3GPP (Third Generation Partnership Project).

In the GPRS operational environment, serving GPRS support nodes (SGSN), each of which is connected to the GSM mobile communication network including a base station subsystem (BSS), can provide a packet service for mobile data terminals via several base stations (BS), i.e. cells. The BSS is a radio interface providing functionalities to provide radio access to a MS (Mobile Station). A BSS serves a subset of cells that constitute a Routing Area (RA).

Mobility Management (MM) in GPRS system supports GPRS Attach, GPRS Detach, authentication, routing update, location update, activation of a PDP context, and deactivation of a PDP context. For mobility management, logical routing areas have been defined to the GPRS network. A routing area RA is an area defined by an operator, comprising one or more cells. Usually, one SGSN serves several routing areas. A routing area is used for determining the location of the MS in the standby state. If the location of the MS is not known in terms of a specific cell, signalling is started with a GPRS page within one routing area RA.

A routing area updating procedure is used for supporting mobility management of a packet switched domain. A routing area (RA) updating procedure takes place when a GPRS-attached MS detects that it has entered a new RA, when a periodic RA update timer has expired, or when the MS has to indicate new access capabilities to the network or, for A/Gb mode, when a suspended MS is not resumed by the BSS (Base station subsystem).

A combined RA/LA (location Area) updating procedure takes place when the MS enters a new RA or when a GPRS-attached MS performs an IMSI attach or when the MS has to indicate new access capabilities to the network, or when a suspended MS is not resumed by the BSS. The MS using GPRS in MS operation mode A performs the normal routing area update procedure during an ongoing circuit-switched transaction.

In the abovementioned two RA updating procedure, procedure message exchange between the MS and the SGSN are described as follows. A ROUTING AREA UPDATING REQUEST message is sent from the MS to the SGSN. In response, a ROUTING AREA UPDATING ACCEPT message is sent from the SGSN to the MS. As last, a ROUTING AREA UPDATING COMPLETE message is sent from the MS to the SGSN, indicating that the procedure is completed.

The ROUTING AREA UPDATING ACCEPT message can include a P-TMSI (Packet-Temporary Mobile Subscriber Identity), an RAI (Routing Area Identifier) and includes a GMM (GPRS Mobility Management) cause for indicating the procedure failure, such as 'MSC temporarily not reachable', 'network failure', or 'Congestion'.

A P-TMSI is a temporary identity issued to a GPRS enabled mobile and unique within a given RA and is used by the GPRS network to page the specified mobile. The P-TMSI has 32 bits and is associated with the TLLI (Temporary Logical Link Identifier). When a new P-TMSI is assigned by the network, the MS and the network shall handle the old and the new P-TMSI as follows.

Upon receipt of a GMM message (e.g. Routing Area Updating Accept) containing a new P-TMSI, the MS considers the new P-TMSI and new RAI and also the old P-TMSI and old RAI as valid in order to react to paging requests and downlink transmission of LLC (Logic Link Control) frames. For uplink transmission of LLC frames the new P-TMSI shall be used. The MS shall consider the old P-TMSI and old RAI as invalid as soon as an LLC frame is received with the local TLLI (Temporary Logical Link Identity) derived from the new P-TMSI.

Upon the transmission of a GMM message containing a new P-TMSI, the network shall consider the new P-TMSI and new RAI and also the old P-TMSI and old RAI as valid in order to be able to receive LLC frames from the MS. The network shall consider the old P-TMSI and old RAI as invalid as soon as an LLC frame is received with the local TLLI derived from the new P-TMSI.

A GPRS suspension procedure enables the network to suspend GPRS services packet flow in the downlink direction. The GPRS suspension procedure shall be used to suspend GPRS services:

a) when the mobile station in a class A mode of operation is handed over to a cell where the support of Class A mode of operation is not possible (e.g. a DTM mobile station entering a cell not supporting DTM);

b) when the GPRS attached mobile station is in a cell that does not support DTM and a circuit switched service is initiated.

The GPRS suspension procedure is initiated by the MS by sending a GPRS SUSPENSION REQUEST message including a suspension cause, a TLLI, and an RAI to a BSC (Base Station Controller). The BSC transfers the GPRS SUSPENSION REQUEST message with the TLLI and RAI to the SGSN. The SGSN acknowledges by returning a GPRS SUSPENSION ACK or rejects by returning a GPRS SUSPENSION NACK. The TLLI is derived from the in use P-TMSI of the MS.

When the SGSN assigns a new P-TMSI to the MS through the routing area updating procedure, the ROUTING AREA UPDATING ACCEPT message includes the new P-TMSI. The MS starts to use the new P-TMSI after receiving the ROUTING AREA UPDATING ACCEPT message. Finally, the MS needs to respond with the ROUTING AREA UPDATING COMPLETE message, and thereby the SGSN confirms the P-TMSI change.

If a circuit switched initiation, such as a MO (Mobile Originating) call, occurs before transmission of the ROUTING AREA UPDATING COMPLETE message and after transmission of the ROUTING AREA UPDATING ACCEPT message, the ROUTING AREA UPDATING COMPLETE message is skipped or blocked, indicating that the P-TMSI change is not confirmed by the SGSN.

For a MS using GPRS services, the circuit switched initiation requires the MS to perform GPRS suspension procedure. In a situation where a new P-TMSI is assigned and the ROUTING AREA UPDATING COMPLETE message is skipped, the MS still initiates the GPRS suspension procedure with a TLLI derived from the new P-TMSI. However, the SGSN rejects the GPRS suspension request since the P-TMSI change is not confirmed by the network. Consequently, the GPRS suspension procedure is failed, and the SGSN pages the MS if there is data sent to the MS. This wastes radio resource for paging since the MS cannot receive this paging in the dedicated mode which the MS enters after the GPRS suspension procedure is performed.

SUMMARY OF THE INVENTION

The present invention therefore provides a method and related communication device for handling P-TMSI changes for a wireless communication system that can avoid procedure suspension failure, especially procedures for GPRS suspension.

The present invention discloses a method of handling a P-TMSI for a network of a wireless communication system. The method includes sending a first message through a first procedure to assign a first P-TMSI to a mobile station using a second P-TMSI, receiving a second message corresponding to a second procedure and the first P-TMSI before the network receives a response message of the first message corresponding to the first procedure, and then accepting the second message.

The present invention further discloses a communication device of a wireless communication system for accurately handling a P-TMSI to avoid procedure failure. The communication device includes a computer readable recording medium, a processor, a communication interfacing unit and a control unit. The computer readable recording medium is used for storing the storage data comprising program code corresponding to a process. The processor is coupled to the computer readable recording medium and used for processing storage data to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes sending a first message through a first procedure to assign a first P-TMSI to a mobile station using a second P-TMSI, receiving a second message corresponding to a second procedure and the first P-TMSI before the communication device receives a response message of the first message corresponding to the first procedure, and then accepting the second message.

The present invention further discloses a method of handling a P-TMSI for a MS of a wireless communication system. The method includes initiating a first procedure with a first P-TMSI, through the first procedure receiving a first message including a second P-TMSI from a network, replacing the first P-TMSI with the second P-TMSI, receiving an indication indicating initiation of a second procedure corresponding to the second P-TMSI before transmission of a second message for acknowledging the first message in the first procedure is performed, and then postponing the second procedure until the second message is transmitted.

The present invention further discloses a communication device of a wireless communication system for accurately handling a P-TMSI to avoid procedure failure. The communication device includes a computer readable recording medium, a processor, a communication interfacing unit and a control unit. The computer readable recording medium is used for storing the storage data comprising program code corresponding to a process. The processor is coupled to the computer readable recording medium and used for processing storage data to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes initiating a first procedure with a first P-TMSI, through the first procedure receiving a first message including a second P-TMSI from a network, replacing the first P-TMSI with the second P-TMSI, receiving an indication indicating initiation of a second procedure corresponding to the second P-TMSI before transmission of a second message for acknowledging the first message in the first procedure is performed, and then postponing the second procedure until the second message is transmitted.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4A and 4B illustrate a flowchart of a process according to FIG. 3.

FIGS. 6A, 6B and 6C illustrate a flowchart of a process according to FIG. 5.

DETAILED DESCRIPTION

Figure 1:
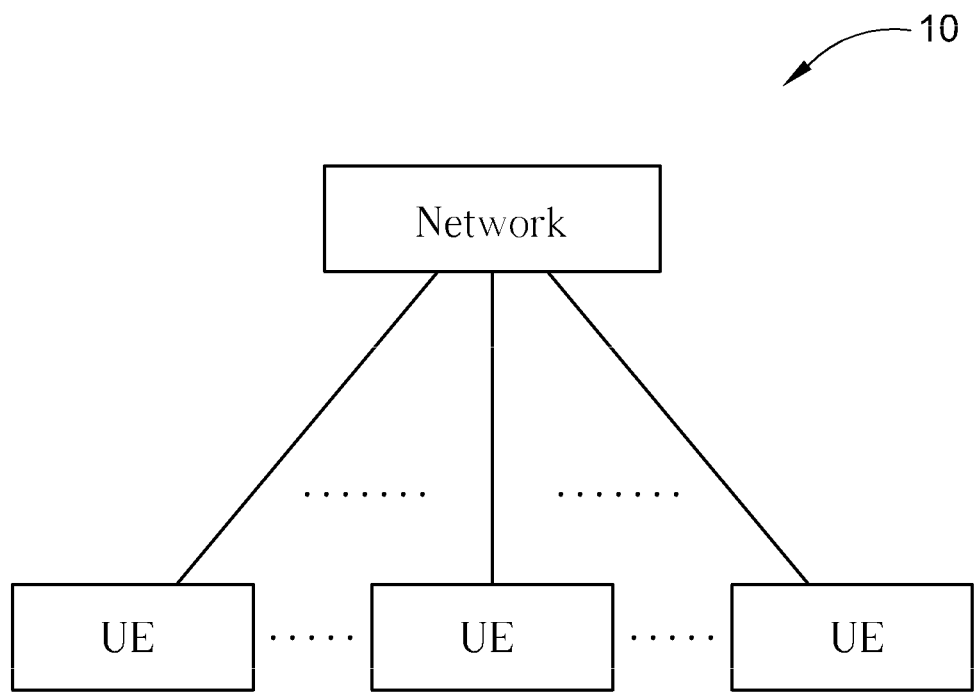
FIG. 1 is a schematic diagram of a wireless communication system.

Please refer to FIG. 1, which illustrates a schematic diagram of a wireless communication system 10. The wireless communication system 10 is a GPRS (General Packet Radio Service) system or other related mobile communication systems, and is briefly composed of a network and a plurality of MSs (Mobile Stations). In FIG. 1, the network and the UEs are simply utilized for illustrating the structure of the wireless communication system 10. Practically, the network includes a BSS (Base station subsystem) including a BSC (Base Station Controller), a UTRAN (UMTS Terrestrial Radio Access Network), a MSC (Mobile Switching Center), a Serving GPRS Support Node (SGSN), a GGSN (Gateway GPRS Support Node), etc. The MSs can be devices such as mobile phones, computer systems, etc.

Figure 2:
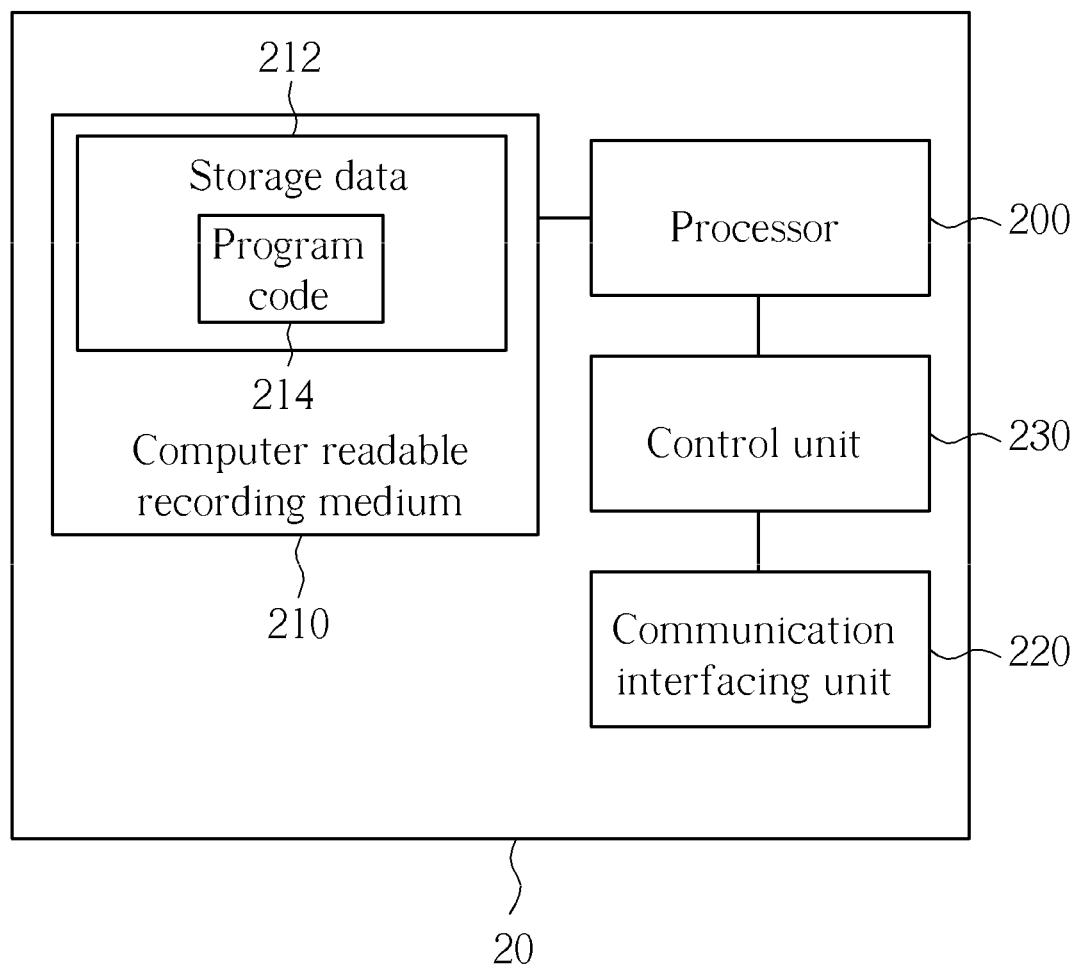
FIG. 2 is a schematic diagram of a communication device according to embodiments of the present invention.

Please refer to FIG. 2, which illustrates a schematic diagram of a communication device 20 according to embodiments of the present invention. The communication device 20 can be the network or the MSs shown in FIG. 1 and includes a processor 200, a computer readable recording medium 210, a communication interfacing unit 220 and a control unit 230. The computer readable recording medium 210 is any data storage device that stores storage data 212 including program code 214 and is thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 includes a radio transceiver for wirelessly communicating with other communication devices and thereby exchanges signals corresponding to the processing results.

Figure 3:
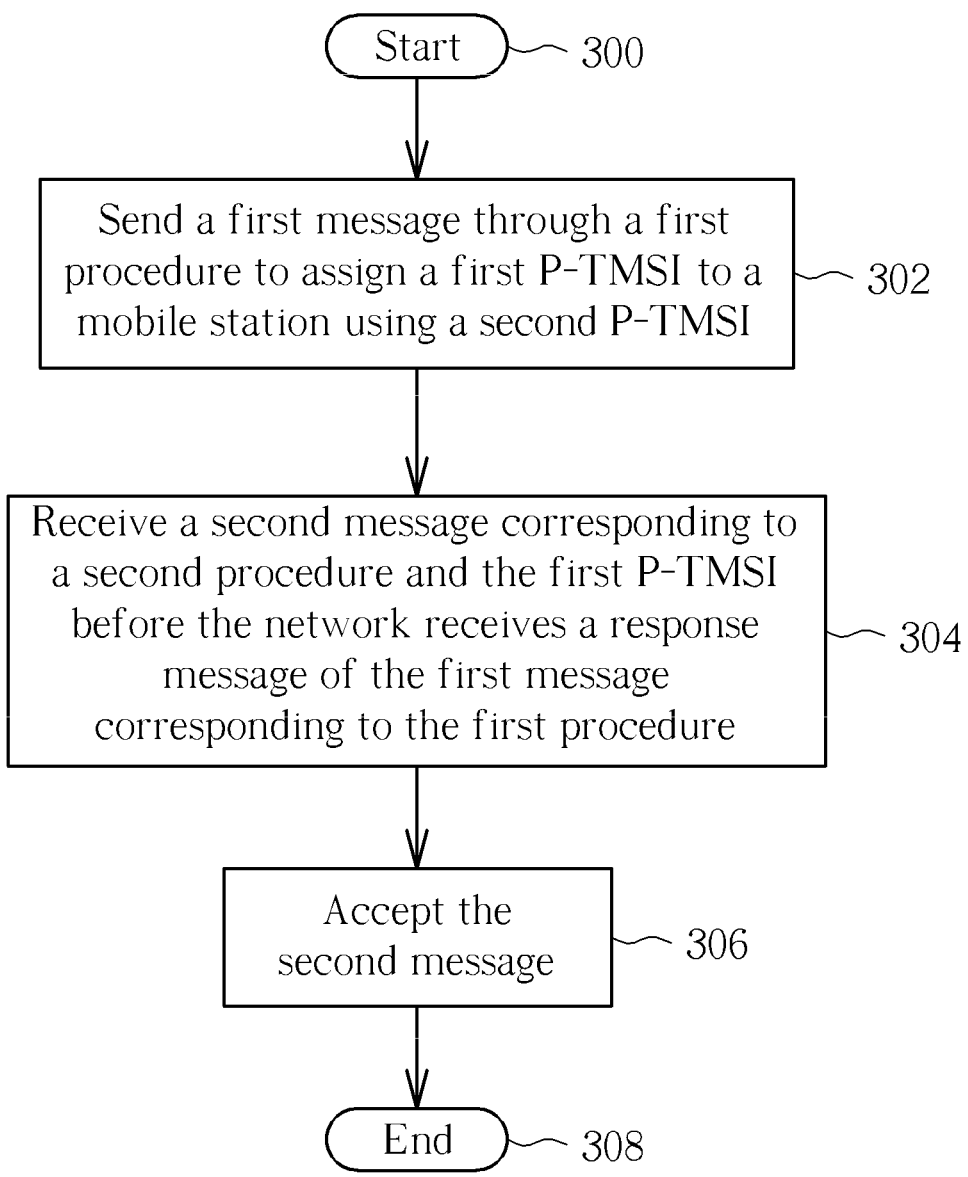
FIG. 3 is a flowchart of a process according to an embodiment of the present invention.

Please refer to FIG. 3, which illustrates a flowchart of a process 30 according to an embodiment of the present invention. The process 30 is utilized for a network of a wireless communication system to handle a packet-temporary mobile subscriber identity (P-TMSI) of a MS and can be compiled into the program code 214. The process 30 includes the following steps:

Step 300: Start.

Step 302: Send a first message through a first procedure to assign a first P-TMSI to a mobile station using a second P-TMSI.

Step 304: Receive a second message corresponding to a second procedure and the first P-TMSI before the network receives a response message of the first message corresponding to the first procedure.

Step 306: Accept the second message.

Step 308: End.

According to the process 30, the network sends a first message through a first procedure to assign a first P-TMSI to a MS using a second P-TMSI. In this situation, the MS replaces the in-use second P-TMSI with the first P-TMSI for following associated procedures after receiving the first message. Before transmitting the response message of the first message for notifying the network that the first P-TMSI is received successfully, the MS initiates the second procedure by sending the second message with the first P-TMSI. In other words, the network receives the second message before the response message. The network receives and accepts the second message, and thus the failure of the second procedure is avoided.

Preferably, the first procedure is an attach, a routing area updating, or a P-TMSI relocation procedure. In this situation, the first message is correspondingly an ATTACH ACCEPT, a ROUTING AREA UPDATING ACCEPT, or a P-TMSI RELOCATION message, and the response message is an ATTCH COMPLETE message, a ROUTING AREA UPDATING COMPLETE message, or a P-TMSI RELOCATION COMPLETE message. The second message is a GPRS SUSPENSION REQUEST message, and the second procedure is a GPRS suspension procedure for suspending GPRS services of the MS. The cause for the MS to initiate the GPRS suspension procedure is initiation of circuit-switched services, such as MO (Mobile Originating) call or short message services.

Please refer to FIGS. 4A and 4B, which illustrate a flow diagram according to an embodiment of the present invention. At the beginning, an MS is powered on and camps on a cell with a first routing area with RAI-1 (Routing Area Identity-1). In Step 1, a location update procedure is performed between the MS and a MSC for IMSI (International Mobile Subscriber Identity) attachment. In Step 2, a GPRS attach procedure is performed between the MS and a SGSN for allowing the MS to receive GPRS services, and an ATTACH ACCEPT message sent to the MS includes a P-TMSI-2 and RAI-1. In other words, the P-TMSI-2 is in use for the MS. Then, the MS reselects a cell of a second routing area with RAI-4. As a result, Step 3 is executed for the MS to initiate a routing area updating procedure by sending a ROUTING AREA UPDATING REQUEST message including an update type of 'RA updating' and P-TMSI-2. In Step 4, a ROUTING AREA UPDATING ACCEPT message is responded by the SGSN and assigns a new P-TMSI, P-TMSI-1. After this, the MS replaces P-TMSI-2 with P-TMSI-1 for any following procedures.

Before a ROUTING AREA UPDATING COMPLETE message which the MS is supposed to send is sent, the MS makes a MO call and therefore needs to perform a GPRS suspension procedure to suspend in-use GPRS services. In Step 5, a GPRS SUSPENSION REQUEST message is sent from the MS to a BSC for initiate the GPRS suspension procedure and includes a local TLLI (Temporary Logical Link Identifier) that is derived from P-TMSI-1. In Step 6, the BSC transfers the GPRS SUSPENSION REQUEST message to the SGSN. In step 7, the SGSN accepts the GPRS SUSPENSION REQUEST message and determines that the TLLI is valid. In this situation, the SGSN sends a GPRS SUSPENSION ACK although the transmission of the ROUTING AREA UPDATING COMPLETE message is skipped. The MS enters a dedicated mode, disallowing the MS to receive any paging messages, after the GPRS suspension procedure.

As a result, the MS is allowed to perform the MO call after the GPRS services are suspended successfully. Furthermore, the successful GPRS suspension procedure prevents the SGSN from wasting resources in paging the MS.

Figure 5:
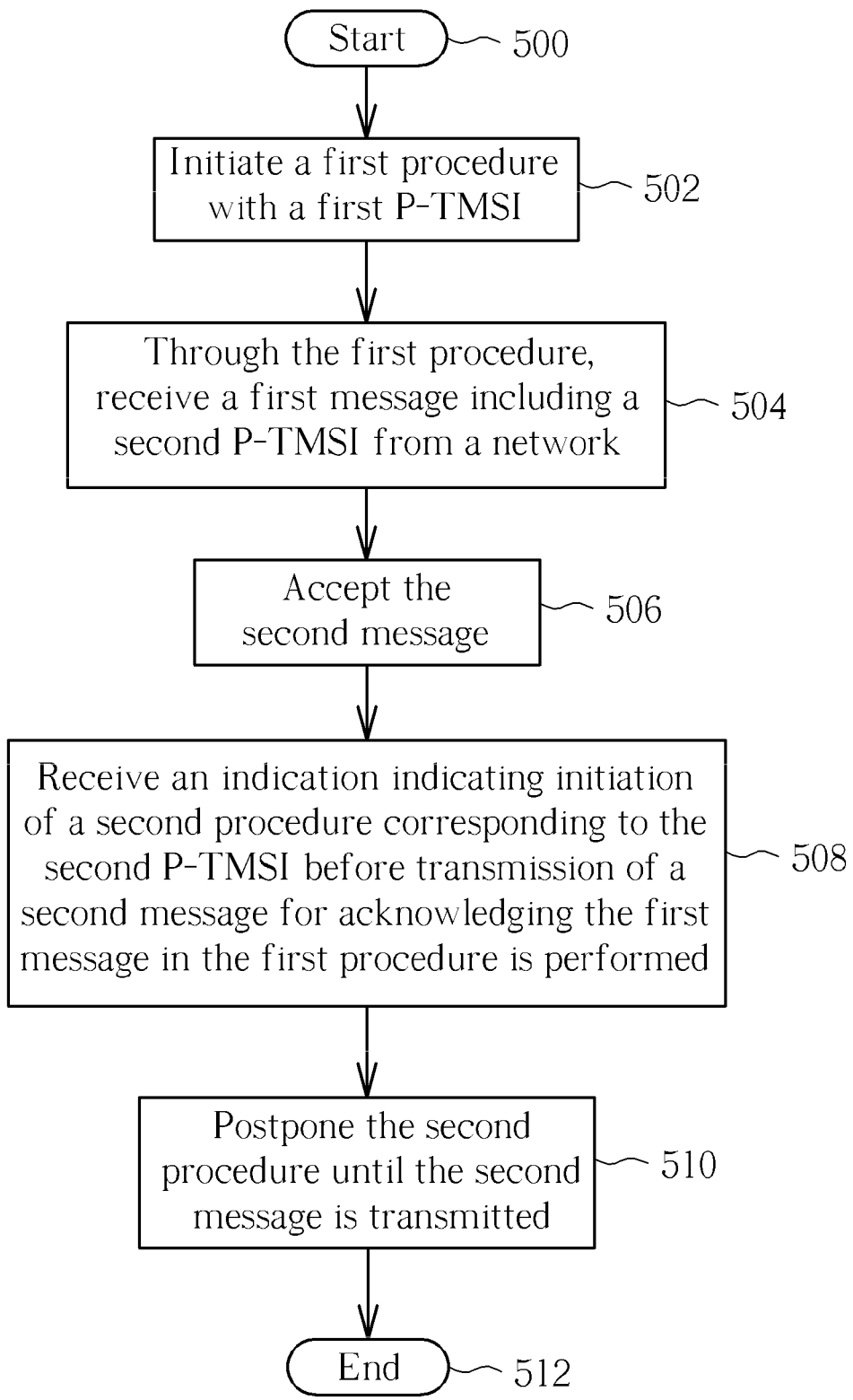
FIG. 5 is a flowchart of a process according to an embodiment of the present invention.

Please refer to FIG. 5, which illustrates a flowchart of a process 50 according to an embodiment of the present invention. The process 50 is utilized for a MS of a wireless communication system to handle a P-TMSI and can be compiled into the program code 214. The process 50 includes the following steps:

Step 500: Start.

Step 502: Initiate a first procedure with a first P-TMSI.

Step 504: Through the first procedure, receive a first message including a second P-TMSI from a network.

Step 506: Replace the first P-TMSI with the second P-TMSI.

Step 508: Receive an indication indicating initiation of a second procedure corresponding to the second P-TMSI before transmission of a second message for acknowledging the first message in the first procedure is performed.

Step 510: Postpone the second procedure until the second message is transmitted.

Step 512: End.

According to the process 50, the MS initiates the first procedure with the first P-TMSI and thereby receives the first message including the second P-TMSI from a network. The in-use first P-TMSI is replaced with the second P-TMSI for any following procedures. After this, the MS receives the indication before the transmission of the second message is performed, where the second message of the first procedure is used for acknowledging the first message. In this situation, the MS postpones the second procedure until the second message is transmitted, irrespective of successfully or unsuccessfully. Thus, the process 50 ensures the second message of the first procedure to be transmitted at least once, thereby avoiding failure of the second procedure due to incomplete first procedure.

For postponing the second procedure, the MS preferably uses a timer to delay the second procedure for a delay time during which the second message is transmitted.

Preferably, the first message is an ATTACH ACCEPT, a ROUTING AREA UPDATING ACCEPT, or a P-TMSI RELOCATION message, and the first procedure is an attach, a routing area updating, or a P-TMSI relocation procedure. The second message is an ATTCH COMPLETE, a ROUTING AREA UPDATING COMPLETE, or a P-TMSI RELOCATION COMPLETE message.

The indication is preferably circuit-switched service initiation, such as a CS paging response, a MO voice call, a CS SMS (Short Message Service) or a location updating request. When the indication is a location updating request, a location updating procedure is triggered, and then triggers a GPRS suspension procedure as well as the second procedure.

Please refer to FIGS. 6A-6C, which illustrate a flow diagram according to an embodiment of the present invention. At the beginning, an MS is powered on and camps on a cell with a first routing area with RAI-1 (Routing Area Identity-1). In Steps 1-3, a GPRS attach procedure is performed between the MS and a SGSN, allowing the MS to receive GPRS services. In Step 2, an ATTACH ACCEPT message assigns a P-TMSI-2 to the MS. After the GPRS attach procedure is completed, the MS reselects a cell with an RAI-4. In this situation, the MS has to initiate a combined routing area updating procedure by sending a ROUTING AREA UPDATING REQUEST message including P-TMSI-2 and RAI-4, as shown in Step 4. In addition, a timer T3311 is started. The SGSN responds a ROUTING AREA UPDATING ACCEPT message that indicates procedure failure with a GMM cause 'MSC temporarily not reachable'. A routing area updating attempt counter counting the number of consecutive unsuccessful routing area update attempts is incremented to 1, and five unsuccessful routing area update attempts are allowed. When the timer T3311 expires, the combined routing area updating procedure is reinitiated. The MS then performs three consecutive, unsuccessful combined routing area updating procedures, and thereby the routing area updating attempt counter is incremented to 4. Detailed description is similar to Steps 4-6 and thus omitted herein for simplicity.

In Step 7, the MS re-initiates the combined routing area updating procedure for the fourth time. In Step 8, the ROUTING AREA UPDATING ACCEPT message indicates the fifth failure of the combined routing area updating procedure with a GMM (GPRS Mobility Management) cause 'Network failure'. Consequently, the routing area updating attempt counter is incremented to 5, and the MS needs to perform a location updating procedure to resume CS (Circuit-Switched) services. The location updating procedure attempts to block transmission of the ROUTING AREA UPDATING COMPLETE message. In addition, the GPRS suspension procedure is triggered by initiation of the location update procedure to suspend the in-use GPRS services of the MS and needs to be performed in advance of the location update procedure.

Since the initiation of the location update procedure belongs to the abovementioned circuit-switched service initiation, the MS postpones the GPRS suspension procedure as shown in Step 9 until the ROUTING AREA UPDATING COMPLETE message is transmitted. As a result, the SGSN is notified that the MS has changed its P-TMSI to P-TMSI-1. In Step 10, a GPRS SUSPENSION REQUEST message is sent from the MS to a BSC for initiating the GPRS suspension procedure and includes a local TLLI (Temporary Logical Link Identifier) that is derived from P-TMSI-1. In Step 11, the BSC transfers the GPRS SUSPENSION REQUEST message to the SGSN. In step 12, the SGSN accepts the GPRS SUSPENSION REQUEST message and determines that the TLLI is valid. In this situation, the SGSN sends a GPRS SUSPENSION ACK. Therefore, the MS can successfully suspend the GPRS services and the location update procedure is performed through Steps 13-15 to resume the CS services.

In conclusion, the embodiments of the present invention avoid procedure failure, especially GPRS suspension procedure failure, by procedure postponement or by procedure permission without completion of the preceding procedure.

Those skilled in the art will readily observe that numerous modifications and alterations of the device and method may be made while retaining the teachings of the invention.

What is claimed is:

1. A method of handling a packet-temporary mobile subscriber identity, hereinafter called P-TMSI, for a network of a wireless communication system, the method comprising:

through a first procedure, sending a first message to assign a first P-TMSI to a mobile station using a second P-TMSI;

receiving a second message corresponding to a second procedure and the first P-TMSI before the network receives a response message of the first message corresponding to the first procedure; and accepting the second message;

wherein the second message corresponding to the second procedure and the first P-TMSI comprises a local temporary logical link identifier derived from the first P-TMSI;

wherein the mobile station receives GPRS, known as General Packet Radio Services, services, the second message is a GPRS SUSPENSION REQUEST message, and the second procedure is a GPRS suspension procedure;

wherein the first procedure makes a P-TMSI change on the mobile station, and the response message is a confirmation message for the P-TMSI change.

2. The method of claim 1, wherein the first message is an ATTACH ACCEPT message, a ROUTING AREA UPDATING ACCEPT message, or a P-TMSI RELOCATION message, the first procedure is a GPRS attach procedure, a routing area updating procedure, or a P-TMSI relocation procedure, and the response message is an ATTCH COMPLETE message, a ROUTING AREA UPDATING COMPLETE message, or a P-TMSI RELOCATION COMPLETE message.

3. A communication device of a wireless communication system for accurately handling a packet-temporary mobile subscriber identity, hereinafter called P-TMSI, to avoid procedure failure, the communication device comprising:

a computer readable recording medium for storing program code corresponding to a process;

a processor coupled to the computer readable recording medium, for processing the program code to execute the process;

wherein the process comprises:

through a first procedure, sending a first message to assign a first P-TMSI to a mobile station using a second P-TMSI;

receiving a second message corresponding to a second procedure and the first P-TMSI before the communication device receives a response message of the first message corresponding to the first procedure; and accepting the second message;

wherein the second message corresponding to the second procedure and the first P-TMSI comprises a local temporary logical link identifier derived from the first P-TMSI;

wherein the mobile station receives GPRS, known as General Packet Radio Services, services, the second message is a GPRS SUSPENSION REQUEST message, and the second procedure is a GPRS suspension procedure;

wherein the first procedure makes a P-TMSI change on the mobile station, and the response message is a confirmation message for the P-TMSI change.

4. The communication device of claim 3, wherein the first message is an ATTACH ACCEPT message, a ROUTING AREA UPDATING ACCEPT message, or a P-TMSI RELOCATION message, the first procedure is a GPRS attach procedure, a routing area updating procedure, or a P-TMSI relocation procedure, and the response message is an ATTCH COMPLETE message, a ROUTING AREA UPDATING COMPLETE message, or a P-TMSI RELOCATION COMPLETE message.

5. A method of handling a packet-temporary mobile subscriber identity, hereinafter called P-TMSI, for a mobile station of a wireless communication system, the method comprising:
    initiating a first procedure with a first P-TMSI;
    through the first procedure, receiving a first message from a network, the first message comprising a second P-TMSI;
    replacing the first P-TMSI with the second P-TMSI;
    receiving an indication indicating initiation of a second procedure corresponding to the second P-TMSI before transmission of a second message for acknowledging that the first message in the first procedure is performed; and
    postponing the second procedure until the second message is transmitted;
    wherein the mobile station receives GPRS, known as General Packet Radio Services, services, and the second procedure is a GPRS suspension procedure;
    wherein the second procedure is a GPRS suspension procedure with a TLLI (Temporary Logical Link Identifier) derived from the second P-TMSI.

6. The method of claim 5, wherein the indication is circuit-switched service initiation.

7. The method of claim 6, wherein the circuit-switched service initiation comprises initiation of a location updating procedure.

8. The method of claim 5, wherein postponing the second procedure until the second message is transmitted comprises using a timer to delay the second procedure for a delay time where the second message is transmitted.

9. The method of claim 5, wherein the first message is an ATTACH ACCEPT message, a ROUTING AREA UPDATING ACCEPT message, or a P-TMSI RELOCATION message, and the first procedure is an attach procedure, a routing area updating procedure, or a P-TMSI relocation procedure.

10. The method of claim 9, wherein the second message is an ATTCH COMPLETE message, a ROUTING AREA UPDATING COMPLETE message, or a P-TMSI RELOCATION COMPLETE message.

11. A communication device of a wireless communication system for accurately handling a packet-temporary mobile subscriber identity, hereinafter called P-TMSI, to avoid procedure failure, the communication device comprising:
    a computer readable recording medium for storing program code corresponding to a process;
    a processor coupled to the computer readable recording medium, for processing the program code to execute the process;
    wherein the process comprises:
        initiating a first procedure with a first P-TMSI;
        through the first procedure, receiving a first message from a network, the first message comprising a second P-TMSI;
        replacing the first P-TMSI with the second P-TMSI;
        receiving an indication indicating initiation of a second procedure corresponding to the second P-TMSI before transmission of a second message for acknowledging the first message in the first procedure is performed; and
        postponing the second procedure until the second message is transmitted;
        wherein the mobile station receives GPRS, known as General Packet Radio Services, services, and the second procedure is a GPRS suspension procedure;
        wherein the second procedure is a GPRS suspension procedure with a TLLI (Temporary Logical Link Identifier) derived from the second P-TMSI.

12. The communication device of claim 11, wherein the indication is circuit-switched service initiation.

13. The communication device of claim 12, wherein the circuit-switched service initiation comprises initiation of a location updating procedure.

14. The communication device of claim 11, wherein postponing the second procedure until the second message for acknowledging the first message in the first procedure is transmitted comprises using a timer to delay the second procedure for a delay time where the second message for acknowledging the first message in the first procedure is transmitted.

15. The communication device of claim 11, wherein the first message is an ATTACH ACCEPT message, a ROUTING AREA UPDATING ACCEPT message, or a P-TMSI RELOCATION message, and the first procedure is an attach procedure, a routing area updating procedure, or a P-TMSI relocation procedure.

16. The communication device of claim 15, wherein the second message is an ATTCH COMPLETE message, a ROUTING AREA UPDATING COMPLETE message, or a P-TMSI RELOCATION COMPLETE message.

* * * * *